(12) United States Patent
Chen et al.

(10) Patent No.: US 11,779,913 B2
(45) Date of Patent: Oct. 10, 2023

(54) AMMONIA SLIP CATALYST WITH IN-SITU PT FIXING

(71) Applicant: Johnson Matthey Public Limited Company, London (GB)

(72) Inventors: Hai-Ying Chen, Wayne, PA (US); Joseph Fedeyko, Wayne, PA (US); Neil Greenham, Royston (GB); Matthew Harris, Royston (GB); Jing Lu, Wayne, PA (US); Yannick Bidal, Royston (GB)

( * ) Notice: Subject to any disclaimer, the term of this patent is extended or adjusted under 35 U.S.C. 154(b) by 0 days.

(21) Appl. No.: 16/352,902

(22) Filed: Mar. 14, 2019

(65) Prior Publication Data

US 2019/0283011 A1    Sep. 19, 2019

Related U.S. Application Data

(60) Provisional application No. 62/642,624, filed on Mar. 14, 2018.

(51) Int. Cl.
*B01J 21/12* (2006.01)
*B01J 23/42* (2006.01)
(Continued)

(52) U.S. Cl.
CPC ...... *B01J 35/0006* (2013.01); *B01D 53/9418* (2013.01); *B01D 53/9436* (2013.01); *B01D 53/9468* (2013.01); *B01J 21/12* (2013.01); *B01J 23/42* (2013.01); *B01J 29/763* (2013.01); *B01J 37/0215* (2013.01); *B01J 37/0244* (2013.01); *B01J 37/0246* (2013.01); *F01N 3/106* (2013.01); *F01N 3/2066* (2013.01); *B01D 2255/1021* (2013.01); *B01D 2255/20738* (2013.01); *B01D 2255/20761* (2013.01); *B01D 2255/30* (2013.01); *B01D 2255/40* (2013.01); *B01D 2255/50* (2013.01); *B01D 2255/504* (2013.01); *B01D 2255/9022* (2013.01); *B01D 2255/9025* (2013.01);
(Continued)

(58) Field of Classification Search
CPC ... B01J 21/12; B01J 23/42; B01J 23/56; B01J 29/743; B01J 35/0006; B01J 37/2015; B01J 37/0244; B01J 37/0246; F01N 3/106; F01N 3/2066; B01D 53/948; B01D 53/9436; B01D 53/9468
USPC ......... 502/60, 258–260, 332, 339, 355, 415, 502/439, 527.12, 527.13, 527.19
See application file for complete search history.

(56) References Cited

U.S. PATENT DOCUMENTS

| 4,010,238 A | 3/1977 | Shiraishi |
| 4,085,193 A | 4/1978 | Nakajima |

(Continued)

FOREIGN PATENT DOCUMENTS

| EP | 1992409 B1 | 10/2013 |
| RU | 2609796 C2 | 2/2017 |

(Continued)

*Primary Examiner* — Cam N. Nguyen (57) ABSTRACT

The invention relates to a catalytic article comprising a substrate having an inlet and an outlet; a first coating comprising a blend of: (1) platinum on a support, and (2) a first SCR catalyst; and a second coating comprising a second SCR catalyst; wherein the support comprises at least one of a zeolite or a $SiO_2$—$Al_2O_3$ mixed oxide. The platinum may be fixed on the support in solution.

21 Claims, 4 Drawing Sheets

(51) Int. Cl.
  *B01J 23/56* (2006.01)
  *B01J 29/74* (2006.01)
  *B01J 35/00* (2006.01)
  *F01N 3/10* (2006.01)
  *F01N 3/20* (2006.01)
  *B01D 53/94* (2006.01)
  *B01J 29/76* (2006.01)
  *B01J 37/02* (2006.01)

(52) U.S. Cl.
  CPC ............... *B01D 2255/9032* (2013.01); *B01D 2257/404* (2013.01); *B01D 2257/406* (2013.01)

(56) References Cited

U.S. PATENT DOCUMENTS

| | | | | |
|---|---|---|---|---|
| 8,293,182 | B2* | 10/2012 | Boorse | B01J 35/04 |
| | | | | 422/180 |
| 9,789,441 | B2* | 10/2017 | Larsson | B01J 29/763 |
| 9,878,287 | B2* | 1/2018 | Lu | B01J 29/44 |
| 9,937,489 | B2* | 4/2018 | Larsson | F01N 3/2828 |
| 9,993,772 | B2* | 6/2018 | Gilbert | F01N 3/106 |
| 10,105,692 | B2* | 10/2018 | Andersen | B01D 53/8634 |
| 10,201,807 | B2* | 2/2019 | Larsson | B01J 23/42 |
| 10,322,372 | B2* | 6/2019 | Chen | B01J 29/068 |
| 10,500,571 | B2* | 12/2019 | Greenham | B01D 53/9468 |
| 10,589,261 | B2* | 3/2020 | Larsson | F01N 3/106 |
| 10,669,910 | B2* | 6/2020 | Chen | B01D 53/9418 |
| 10,744,459 | B2* | 8/2020 | Hoke | B01J 23/63 |
| 10,807,040 | B2* | 10/2020 | Chen | B01J 23/6482 |
| 10,807,081 | B2* | 10/2020 | Larsson | B01J 23/44 |
| 10,828,603 | B2* | 11/2020 | Chen | F01N 3/2066 |
| 10,857,521 | B2* | 12/2020 | Sung | B01J 29/7415 |
| 10,926,221 | B2* | 2/2021 | Chen | B01D 53/944 |
| 11,000,838 | B2* | 5/2021 | Greenham | B01J 37/0236 |
| 2008/0286184 | A1 | 11/2008 | Ando | |
| 2011/0286900 | A1* | 11/2011 | Caudle | B01J 23/42 |
| | | | | 423/213.5 |
| 2016/0367937 | A1 | 12/2016 | Lu et al. | |
| 2016/0367938 | A1 | 12/2016 | Larsson | |
| 2016/0367941 | A1 | 12/2016 | Gilbert | |
| 2016/0367973 | A1 | 12/2016 | Larsson et al. | |
| 2016/0367974 | A1 | 12/2016 | Larsson | |
| 2016/0367975 | A1* | 12/2016 | Lu | F01N 3/2066 |
| 2017/0087541 | A1 | 3/2017 | Andersen | |
| 2017/0320048 | A1* | 11/2017 | Xue | F01N 3/0842 |
| 2018/0038252 | A1* | 2/2018 | Yang | B01J 23/42 |
| 2018/0111086 | A1* | 4/2018 | Chen | B01D 53/9436 |
| 2018/0111089 | A1* | 4/2018 | Li | B01D 53/9468 |
| 2018/0214824 | A1* | 8/2018 | Dumbuya | B01J 37/0246 |
| 2019/0001268 | A1* | 1/2019 | Chen | B01D 53/9418 |
| 2019/0176128 | A1* | 6/2019 | Micallef | B01J 37/0244 |
| 2019/0186314 | A1* | 6/2019 | Sung | B01D 53/94 |
| 2019/0299160 | A1* | 10/2019 | Chen | B01J 35/04 |
| 2019/0358615 | A1* | 11/2019 | Sung | B01D 53/9468 |
| 2020/0215520 | A1* | 7/2020 | Greenham | B01J 23/42 |
| 2020/0346192 | A1* | 11/2020 | Sung | B01D 53/944 |
| 2020/0384449 | A1* | 12/2020 | Sung | F01N 3/106 |
| 2021/0162344 | A1* | 6/2021 | Chen | B01J 37/0244 |

FOREIGN PATENT DOCUMENTS

| | | |
|---|---|---|
| RU | 2640411 C2 | 1/2018 |
| WO | 2012175948 A1 | 12/2012 |
| WO | 201764498 W | 4/2017 |

* cited by examiner

AMMONIA SLIP CATALYST WITH IN-SITU PT FIXING

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore, the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide byproducts are formed.

SUMMARY OF THE INVENTION

According to some embodiments of the present invention, a catalytic article may include: a substrate having an inlet and an outlet; a first coating comprising a blend of: (1) platinum on a support, and (2) a first SCR catalyst; and a second coating comprising a second SCR catalyst; wherein the support comprises at least one of a zeolite or a $SiO_2$—$Al_2O_3$ mixed oxide. In some embodiments, the platinum is fixed on the support in solution. In some embodiments, the first SCR catalyst is a Cu—SCR catalyst or a Fe—SCR catalyst.

In some embodiments, the support comprises a $SiO_2$—$Al_2O_3$ mixed oxide. In some embodiments, $SiO_2$ is present in an amount of 1 wt % to about 70 wt %, or about 40 wt % to about 70 wt % of the mixed oxide.

In some embodiments, the support comprises a zeolite. A suitable zeolite may have an external surface area of at least 50 $m^2/g$; at least 70 $m^2/g$; or at least 100 $m^2/g$. In some embodiments, a suitable zeolite has an average crystal size of less than about 1 µm; less than about 0.5 µm; or less than about 0.3 µm. In some embodiments, a suitable zeolite has a silica-to-alumina ratio of greater than 100; greater than 300; or greater than 1000. In certain embodiments, a zeolite is selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof. In some embodiments, the zeolite is selected from the group of Framework Types consisting of CHA, LEV, AEI, AFX, ERI, SFW, KFI, DDR, ITE, BEA, MFI and FER.

In some embodiments, the second coating that completely overlaps the first coating. In some embodiments, the second coating partially overlaps the first coating. In some embodiments, the second coating extends from the inlet end toward the outlet end covering less than a full length of the substrate. In some embodiments, the first coating extends from the outlet end towards the inlet end covering less than a full length of the substrate. In some embodiments, the second SCR catalyst is located on the inlet side of the coating comprising the blend of platinum on a support with the first SCR catalyst. In some embodiments, the second SCR catalyst is located on the outlet side of the coating comprising the blend of platinum on a support with the first SCR catalyst.

In some embodiments, the platinum is present in an amount of at least one of: (a) 0.01-0.3 wt. %; (b) 0.03-0.2 wt. %; (c) 0.05-0.17 wt. %; and (d) 0.07-0.15 wt. %, inclusive, relative to the weight of the support of platinum+the weight of platinum+the weight of the first SCR catalyst in the blend. A weight ratio of the first SCR catalyst to platinum on the support may be in the range of at least one of: (a) 0:1 to 300:1, (b) 3:1 to 300:1, (c) 7:1 to 100:1; and (d) 10:1 to 50:1, inclusive, based on the weight of these components.

In some embodiments, the blend further comprises at least one of palladium (Pd), gold (Au) silver (Ag), ruthenium (Ru) or rhodium (Rh).

In certain embodiments, the second SCR catalyst is a base metal, an oxide of a base metal, a molecular sieve, a metal exchanged molecular sieve, a mixed oxide or a mixture thereof. The base metal may be selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof. Such second SCR catalyst may further include at least one base metal promoter.

Where the second SCR catalyst is a molecular sieve or a metal exchanged molecular sieve, the molecular sieve or the metal exchanged molecular sieve may be small pore, medium pore, large pore or a mixture thereof. In some embodiments, the second SCR catalyst comprises a molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. In some embodiments, the second SCR catalyst comprises a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. In some embodiments, the second SCR catalyst comprises a small pore molecular sieve selected from the group of Framework Types consisting of CHA, LEV, AEI, AFX, ERI, SFW, KFI, DDR and ITE. In some embodiments, the second SCR catalyst comprises a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof. In some embodiments, the second SCR catalyst comprises a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. In certain embodiments, the second SCR catalyst comprises promoted-Ce—Zr or promoted-$MnO_2$.

A suitable substrate may include cordierite, a high porosity cordierite, a metallic substrate, an extruded SCR, a filter, or an SCRF.

According to some embodiments of the present invention, an exhaust system includes a catalytic article as described herein and a means for introducing a reductant upstream of the catalytic article. An exhaust system may further include a third SCR catalyst that provides ≤100% NOx conversion, wherein the third SCR catalyst is a Cu-zeolite SCR catalyst and is placed an exhaust gas flow upstream of the catalytic article described herein.

According to some embodiments of the present invention, a method of improving $NH_3$ conversion an exhaust gas at a temperature of about 300° C. or less includes contacting an exhaust gas comprising ammonia with a catalytic article as described herein.

According to some embodiments of the present invention, a method of improving $NH_3$ conversion an exhaust gas at a temperature of about 300° C. or less includes contacting an exhaust gas comprising ammonia with a catalytic article as described herein, which has platinum which was fixed on the support in solution. In some embodiments, $NH_3$ conversion is about 30% to about 100% greater as compared to a catalyst comprising a comparable formulation in which the platinum is pre-fixed on the support.

According to some embodiments of the present invention, a method of treating exhaust gas comprising ammonia and NOx includes contacting an exhaust gas comprising ammonia with a catalytic article as described herein. In some embodiments, the weight ratio of ammonia to NOx in the exhaust gas is >1.0 for at least a portion of the operating time of the system.

BRIEF DESCRIPTION OF THE DRAWINGS

FIGS. 1-8 are schematic representations of configurations of catalysts comprising a blend of (1) platinum on a support and (2) a first SCR catalyst. The portion of the catalyst comprising a blend of (1) platinum on a support and (2) a first SCR catalyst, is labeled as "blend" in these figures.

DETAILED DESCRIPTION OF THE INVENTION

Catalysts of the present invention relate to ammonia slip catalysts which may provide improved $NH_3$ conversion at lower temperatures, and which may be prepared more cost effectively. Catalyst articles of embodiments of the present invention include a substrate with a first coating having a blend of: (1) platinum on a support, and (2) a first SCR catalyst, where the support includes a zeolite and/or a $SiO_2$—$Al_2O_3$ mixed oxide. The catalyst articles also include a second coating comprising an SCR catalyst. In some embodiments, the platinum is fixed on the support in solution, i.e. in-situ. The catalysts and specific configurations are described in further detail below.

Platinum on a Support/Ammonia Oxidation Catalysts

Embodiments of the present invention include platinum on a support, which may be included as an ammonia oxidation catalyst in catalyst articles as described herein. Preferably, the support includes a zeolite and/or a $SiO_2$—$Al_2O_3$ mixed oxide. In some embodiments, the platinum may be fixed on the support in solution, i.e. by in-situ Pt-fixing.

Catalytic articles of the present invention include platinum on a support, where the support includes a zeolite and/or a $SiO_2$—$Al_2O_3$ mixed oxide. In some embodiments, the platinum is present on the support in an amount of about 0.5 wt % to about 10 wt % of the total weight of the platinum and the support; about 1 wt % to about 6 wt % of the total weight of the platinum and the support; about 1.5 wt % to about 4 wt % of the total weight of the platinum and the support; about 10 wt % of the total weight of the platinum and the support; about 0.5 wt % of the total weight of the platinum and the support; about 1 wt % of the total weight of the platinum and the support; about 2 wt % of the total weight of the platinum and the support; about 3 wt % of the total weight of the platinum and the support; about 4 wt % of the total weight of the platinum and the support; about 5 wt % of the total weight of the platinum and the support; about 6 wt % of the total weight of the platinum and the support; about 7 wt % of the total weight of the platinum and the support; about 8 wt % of the total weight of the platinum and the support; about 9 wt % of the total weight of the platinum and the support; or about 10 wt % of the total weight of the platinum and the support.

In embodiments where platinum is supported on a $SiO_2$—$Al_2O_3$ mixed oxide, the $SiO_2$ may be present in an amount of about 1 wt % to about 80 wt % of the mixed oxide; about 1 wt % to about 75 wt % of the mixed oxide; about 1 wt % to about 70 wt % of the mixed oxide; about 5 wt % to about 70 wt % of the mixed oxide; about 10 wt % to about 70 wt % of the mixed oxide; about 20 wt % to about 70 wt % of the mixed oxide; about 30 wt % to about 70 wt % of the mixed oxide; about 40 wt % to about 70 wt % of the mixed oxide; about 50 wt % to about 60 wt % of the mixed oxide; about 1 wt % of the mixed oxide; about 5 wt % of the mixed oxide; about 10 wt % of the mixed oxide; about 20 wt % of the mixed oxide; about 30 wt % of the mixed oxide; about 40 wt % of the mixed oxide; about 50 wt % of the mixed oxide; about 60 wt % of the mixed oxide; about 70 wt % of the mixed oxide; about 75 wt % of the mixed oxide; or about 80 wt % of the mixed oxide.

In embodiments where platinum is supported on a zeolite, a suitable zeolite may have an external surface area of at least about 30 $m^2/g$; at least about 40 $m^2/g$; at least about 50 $m^2/g$; at least about 60 $m^2/g$; at least about 70 $m^2/g$; at least about 80 $m^2/g$; at least about 90 $m^2/g$; or at least about 100 $m^2/g$. In some embodiments, a suitable zeolite may have an average crystal size of about 2 μm or less; about 1.5 μm or less; about 1 μm or less; about 0.5 μm or less; about 0.3 μm or less; less than about 2 μm; less than about 1.5 μm; less than about 1 μm; less than about 0.5 μm; less than about 0.3 μm; about 0.1 μm to about 2 μm; about 0.3 μm to about 1.5 μm; or about 0.5 μm to about 1 μm. Notably, particle size may be significantly different than a zeolite crystal size, as a particle may consist of aggregates of many smaller crystals. In some embodiments, a suitable zeolite has a silica-to-alumina ratio of at least 100; at least 200; at least 250; at least 300; at least 400; at least 500; at least 600; at least 750; at least 800; or at least 1000. Zeolites are described in further detail in the SCR catalyst section below. In some embodiments, a suitable zeolite for supporting platinum is selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof. In some embodiments, a suitable zeolite for selecting platinum is selected from the group of Framework Types consisting of CHA, LEV, AEI, AFX, ERI, SFW, KFI, DDR, ITE, BEA, MFI and FER Catalyst articles of the present invention may include one or more ammonia oxidation catalysts, also called an ammonia slip catalyst ("ASC"). A preferred ammonia oxidation catalyst includes platinum on a support, as described above, however, other or additional ammonia oxidation catalyst may be included in embodiments of the present invention. One or more ammonia oxidation catalysts may be included with or downstream from an SCR catalyst, to oxidize excess ammonia and prevent it from being released to the atmosphere. In some embodiments the ammonia oxidation catalyst may be included on the same substrate as an SCR catalyst, or blended with an SCR catalyst. In certain embodiments, the ammonia oxidation catalyst material may be selected and formulated to favor the oxidation of ammonia instead of the formation of $NO_x$ or $N_2O$. Generally preferred catalyst materials include platinum, palladium, or a combination thereof. The ammonia oxidation catalyst may comprise platinum and/or palladium supported on a metal oxide. In some embodiments, the catalyst is disposed on a high surface area support, including but not limited to alumina.

In some embodiments, an ammonia oxidation catalyst comprises a platinum group metal on a siliceous support. A siliceous material may include a material such as: (1) silica; (2) a zeolite with a silica-to-alumina ratio of at least 200; and (3) amorphous silica-doped alumina with SiO2 content≥40%. In some embodiments, a siliceous material may include a material such as a zeolite with a silica-to-alumina ratio of at least 200; at least 250; at least 300; at least 400; at least 500; at least 600; at least 750; at least 800; or at least 1000. In some embodiments, a platinum group metal is present on the support in an amount of about 0.5 wt % to about 10 wt % of the total weight of the platinum group metal and the support; about 1 wt % to about 6 wt % of the total weight of the platinum group metal and the support; about 1.5 wt % to about 4 wt % of the total weight of the platinum group metal and the support; about 10 wt % of the total weight of the platinum group metal and the support; about 0.5 wt % of the total weight of the platinum group metal and the support; about 1 wt % of the total weight of the platinum group metal and the support; about 2 wt % of the total weight of the platinum group metal and the support; about 3 wt % of the total weight of the platinum group metal and the support; about 4 wt % of the total weight of the platinum group metal and the support; about 5 wt % of the total weight of the platinum group metal and the support; about 6 wt % of the total weight of the platinum group metal and the support; about 7 wt % of the total weight of the platinum group metal and the support; about 8 wt % of the total weight of the platinum group metal and the support; about 9 wt % of the total weight of the platinum group metal and the support; or about 10 wt % of the total weight of the platinum group metal and the support.

In some embodiments, the siliceous support can comprise a molecular sieve having a BEA, CDO, CON, FAU, MEL, MFI or MWW Framework Type.

SCR Catalyst

Systems of the present invention may include one or more SCR catalyst. In some embodiments, a catalyst article may include a first SCR catalyst and a second SCR catalyst. In some embodiments, the first SCR catalyst and the second SCR catalyst may comprise the same formulation as each other. In some embodiments, the first SCR catalyst and the second SCR catalyst may comprise different formulations than each other.

An exhaust system of embodiments of the present invention may include an SCR catalyst which is positioned downstream of an injector for introducing ammonia or a compound decomposable to ammonia into the exhaust gas. The SCR catalyst may be positioned directly downstream of the injector for injecting ammonia or a compound decomposable to ammonia (e.g. there is no intervening catalyst between the injector and the SCR catalyst).

The SCR catalyst includes a substrate and a catalyst composition. The substrate may be a flow-through substrate or a filtering substrate. When the SCR catalyst has a flow-through substrate, then the substrate may comprise the SCR catalyst composition (i.e. the SCR catalyst is obtained by extrusion) or the SCR catalyst composition may be disposed or supported on the substrate (i.e. the SCR catalyst composition is applied onto the substrate by a washcoating method).

When the SCR catalyst has a filtering substrate, then it is a selective catalytic reduction filter catalyst, which is referred to herein by the abbreviation "SCRF". The SCRF comprises a filtering substrate and the selective catalytic reduction (SCR) composition. References to use of SCR catalysts throughout this application are understood to include use of SCRF catalysts as well, where applicable.

The selective catalytic reduction composition may comprise, or consist essentially of, a metal oxide based SCR catalyst formulation, a base metal based SCR catalyst formulation, a molecular sieve based SCR catalyst formulation, a metal exchanged molecular sieve, or mixtures thereof. Such SCR catalyst formulations are known in the art. Typical compositions are described in U.S. Pat. Nos. 4,010,238 and 4,085,193, the entire contents of which are incorporated herein by reference.

The selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

The metal oxide based SCR catalyst formulation may comprise, or consist essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt % (e.g. of the metal oxide based SCR formulation) and/or the concentration of the oxide of tungsten (e.g. $WO_3$) is from 5 to 20 wt %. More preferably, the oxide of vanadium (e.g. $V_2O_5$) and the oxide of tungsten (e.g. $WO_3$) are supported on titania (e.g. $TiO_2$). These catalysts may contain other inorganic materials such as SiO2 and ZrO2 acting as binders and promoters.

When the refractory oxide is ceria (e.g. $CeO_2$), then preferably the concentration of the oxide of vanadium is from 0.1 to 9 wt % (e.g. of the metal oxide based SCR formulation) and/or the concentration of the oxide of tungsten (e.g. $WO_3$) is from 0.1 to 9 wt %.

The metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$)

The selective catalytic reduction composition may comprise, or consist essentially of, a base metal based SCR catalyst formulation. Suitable base metals may include vanadium (V), molybdenum (Mo) and tungsten (W), chromium (Cr), cerium (Ce), manganese (Mn), iron (Fe), cobalt (Co), nickel (Ni), and copper (Cu), and mixtures thereof.

When the SCR catalyst is a base metal or mixed base metal oxide, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal), or mixtures thereof. The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO). A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5.

When the molecular sieve has an aluminosilicate framework (e.g. the molecular sieve is a zeolite), then typically the molecular sieve has a silica to alumina molar ratio (SAR) of from 5 to 200 (e.g. 10 to 200), 10 to 100 (e.g. 10 to 30 or 20 to 80), such as 12 to 40, or 15 to 30. In some embodiments, a suitable molecular sieve has a SAR of >200; >600; or >1200. In some embodiments, the molecular sieve has a SAR of from about 1500 to about 2100.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, EM, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

The molecular sieve based SCR catalyst formulation preferably comprises a transition metal exchanged molecular sieve. A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. The transition metal may be selected from the group consisting of cobalt, copper, iron, manganese, nickel, palladium, platinum, ruthenium and rhenium.

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

The metal exchanged molecular sieve can be a copper (Cu) supported small pore molecular sieve having from about 0.1 to about 20.0 wt. % copper of the total weight of the catalyst. More preferably copper is present from about 0.5 wt. % to about 15 wt. % of the total weight of the catalyst. Most preferably copper is present from about 1 wt. % to about 9 wt. % of the total weight of the catalyst.

In general, the selective catalytic reduction catalyst comprises the selective catalytic reduction composition in a total concentration of 0.5 to 4.0 g in$^{-3}$, preferably 1.0 to 3.0 4.0 g in$^{-3}$.

The SCR catalyst composition may comprise a mixture of a metal oxide based SCR catalyst formulation and a molecular sieve based SCR catalyst formulation. The (a) metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation may comprise a transition metal exchanged molecular sieve.

When the SCR catalyst is an SCRF, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 μm. It is preferred that the mean pore size is from 10 to 40 μm, such as 15 to 35 μm, more preferably 20 to 30 μm.

The wall flow filter substrate may have a symmetric cell design or an asymmetric cell design.

In general for an SCRF, the selective catalytic reduction composition is disposed within the wall of the wall-flow filter substrate monolith. Additionally, the selective catalytic reduction composition may be disposed on the walls of the inlet channels and/or on the walls of the outlet channels.

Blend

Embodiments of the present invention may include a blend of (1) platinum on a support, and (2) an SCR catalyst. In some embodiments, within the blend, a weight ratio of the SCR catalyst to the platinum on a support is about 3:1 to about 300:1; about 3:1 to about 250:1; about 3:1 to about 200:1; about 4:1 to about 150:1; about 5:1 to about 100:1; about 6:1 to about 90:1; about 7:1 to about 80:1; about 7:1 to about 100:1; about 8:1 to about 70:1; about 9:1 to about 60:1; about 10:1 to about 50:1; about 3:1; about 4:1; about 5:1; about 6:1; about 7:1; about 8:1; about 9:1; about 10:1; about 15:1; about 20:1; about 25:1; about 30:1; about 40:1; about 50:1; about 75:1; about 100:1; about 125:1; about 150:1; about 175:1; about 200:1; about 225:1; about 250:1; about 275:1; or about 300:1.

The term "active component loading" refers to the weight of the support of platinum+the weight of platinum+the weight of the first SCR catalyst in the blend. In some embodiments, platinum is present in an active component loading from about 0.01 wt % to about 0.25 wt %, inclusive; about 0.04 wt % to about 0.2 wt %, inclusive; about 0.07 wt % to about 0.17 wt %, inclusive; about 0.05 wt % to about 0.15 wt %, inclusive; about 0.01 wt %; about 0.02 wt %; about 0.03 wt %; about 0.04 wt %; about 0.05 wt %; about 0.06 wt %; about 0.07 wt %; about 0.08 wt %; about 0.1 wt %; about 0.12 wt %; about 0.15 wt %; about 0.17 wt %; about 0.2 wt %; about 0.22 wt %; or about 0.25 wt %.

In some embodiments, the blend comprising platinum on the support and an SCR catalyst further comprises at least one of palladium (Pd), gold (Au) silver (Ag), ruthenium (Ru) or rhodium (Rh).

Substrate

Catalysts of the present invention may each further comprise a flow-through substrate or filter substrate. In one embodiment, the catalyst may be coated onto the flow-through or filter substrate, and preferably deposited on the flow-through or filter substrate using a washcoat procedure.

The combination of an SCR catalyst and a filter is known as a selective catalytic reduction filter (SCRF catalyst). An SCRF catalyst is a single-substrate device that combines the functionality of an SCR and particulate filter, and is suitable for embodiments of the present invention as desired. Description of and references to the SCR catalyst throughout this application are understood to include the SCRF catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Configurations

Embodiments of the present invention relate to catalytic articles having a first coating and a second coating, wherein the first coating includes a blend of (1) platinum of a support, and (2) a first SCR catalyst, and the second coating including a second SCR catalyst. The catalytic articles may be prepared with various configurations. In some embodiments, the coatings are arranged such that the exhaust gas contacts the second coating before contacting the first coating. In some embodiments, the second SCR catalyst is located on the inlet side of the blend. In some embodiments, the SCR catalyst is located on the outlet side of the blend.

Figure 1:
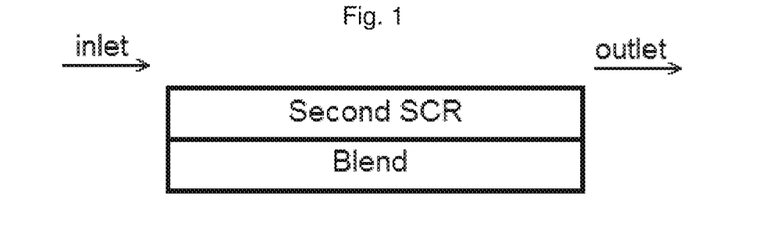
FIG. 1 depicts a configuration in which the second SCR catalyst is positioned in the exhaust gas flow over the blend and the second SCR covers the entire blend.

In a first configuration, a catalyst can comprise a first coating comprising a blend of (1) platinum on a support and (2) a first SCR catalyst, and a second coating comprising a second SCR catalyst, where the second coating is located in a layer over the first coating and the second coating covers all of the first coating. FIG. 1 depicts an example of this configuration, in which the second SCR is positioned in the exhaust gas flow over the blend and the second SCR covers the entire blend.

Figure 2:
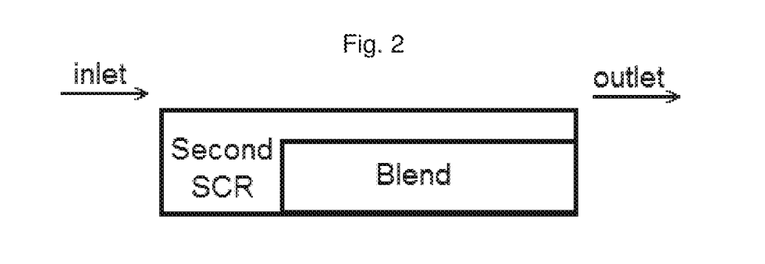
FIG. 2 depicts a configuration in which the second SCR catalyst is positioned in the exhaust gas flow before the blend and the second SCR covers the entire blend.

In a second configuration, a catalyst can comprise a first coating comprising a blend of (1) platinum on a support and (2) a first SCR catalyst, and a second coating comprising a second SCR catalyst, where the first coating extends from the outlet end toward the inlet end, covering less than a full length of the substrate, and the second coating extends the entire length of the substrate, completely overlapping the first coating. FIG. 2 depicts an example of this configuration, in which the second SCR is positioned in the exhaust gas flow before the blend and the second SCR completely overlaps the blend.

Figure 3:
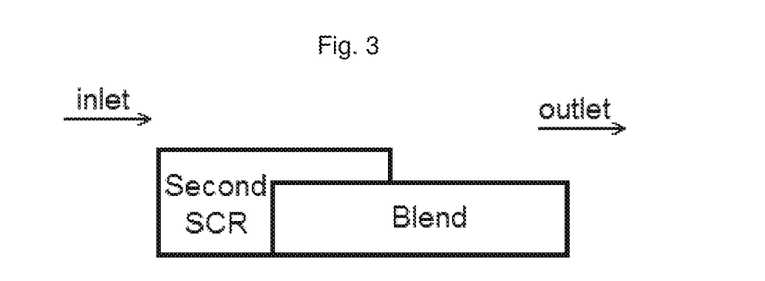
FIG. 3 depicts a configuration in which the second SCR catalyst is positioned in the exhaust gas flow before the blend and the second SCR covers a portion of, but not the entire blend.

In a third configuration, a catalyst can comprise a first coating comprising a blend of (1) platinum on a support and (2) a first SCR catalyst, and a second coating comprising a second SCR catalyst, where the first coating extends from the outlet end toward the inlet end, covering less than a full length of the substrate, and the second coating extends from the inlet end towards the outlet end, partially overlapping the first coating. The second SCR catalyst can overlap the first coating by an amount from about 10% to about 95%, inclusive, preferably about 50% to about 95%, inclusive. FIG. 3 depicts an example of this configuration, in which the second SCR is positioned in the exhaust gas flow before the blend and the second SCR covers a portion, but not all, of the blend. In FIG. 3, the second SCR covers about 40% of the blend.

Figure 4:
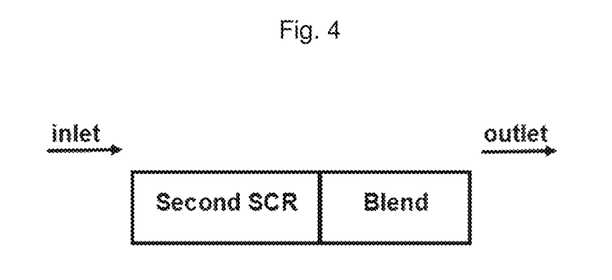
FIG. 4 depicts a configuration in which the second SCR catalyst is positioned in the exhaust gas flow before the blend and does not cover the blend.

In a fourth configuration, a catalyst can comprise a first coating comprising a blend of (1) platinum on a support and (2) a first SCR catalyst, and a second coating comprising a second SCR catalyst, where the first coating extends from the outlet end toward the inlet end, covering less than a full length of the substrate, and the second coating extends from the inlet end towards the outlet end, without overlapping the first coating. There may be a space between the first coating and the second coating, the first coating and the second coating may meet but not overlap, or there may be a slight and insubstantial overlap of the first and second coating. FIG. 4 depicts an example of this configuration, in which the second SCR is positioned in the exhaust gas flow before the blend and the second SCR meets but does not overlap the blend.

Figure 5:
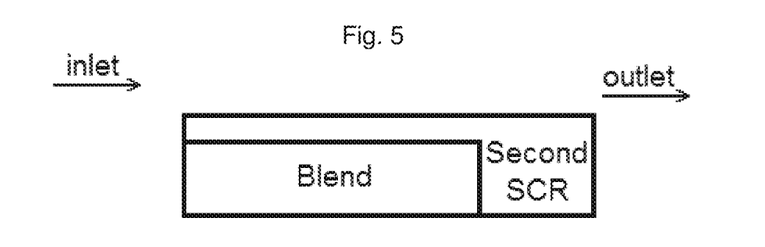
FIG. 5 depicts a configuration in which the second SCR catalyst covers the entire blend and a portion of the second SCR is positioned in the exhaust gas flow after the blend.

In a fifth configuration, a catalyst can comprise a first coating comprising a blend of (1) platinum on a support and (2) a first SCR catalyst, and a second coating comprising a second SCR catalyst, where the first coating extends from the inlet end toward the outlet end, covering less than a full length of the substrate, and the second coating extends the entire length of the substrate, completely overlapping the first coating. FIG. 5 depicts an example of this configuration, in which the second SCR covers the entire blend and a portion of the second SCR is positioned in the exhaust gas flow after the blend.

Figure 6:
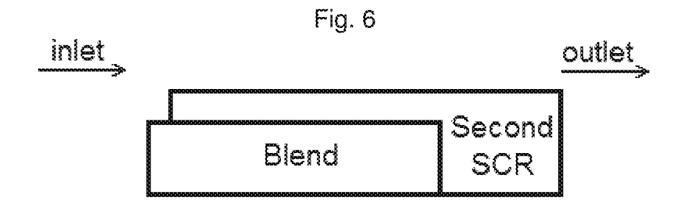
FIG. 6 depicts a configuration in which the second SCR catalyst covers a portion of, but not the entire blend and a portion of the second SCR is positioned in the exhaust gas flow after the blend.

In a sixth configuration, a catalyst can comprise a first coating comprising a blend of (1) platinum on a support and (2) a first SCR catalyst, and a second coating comprising a second SCR catalyst, where the first coating extends from the inlet end toward the outlet end, covering less than a full length of the substrate, and the second coating extends from the outlet end toward the inlet end, covering less than the full length of the substrate, and partially overlapping the first coating. The second SCR catalyst can overlap the blend by an amount from about 10% to about 95%, inclusive, preferably about 50% to about 95% inclusive. FIG. 6 depicts an example of this configuration, in which the second SCR covers a portion of, but not the entire blend, and a portion of the second SCR is positioned in the exhaust gas flow after the blend. In FIG. 6, the second SCR covers about 95% of the blend.

Figure 7:
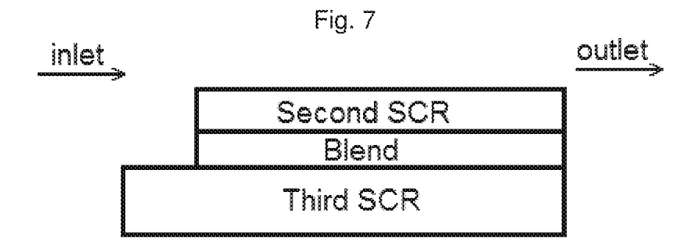
FIG. 7 depicts a configuration in which a third SCR catalyst is a bottom layer on a substrate, with a second layer comprising the blend, partially covering the third SCR catalyst, and a third layer, comprising a second SCR catalyst, positioned over and covering all of the blend layer.

In a seventh configuration, a catalyst can comprise a first layer comprising a third SCR catalyst. The first layer may be partially, but not completely, covered by a coating comprising a blend of (1) platinum on a support and (2) a first SCR catalyst. The blend can cover the third SCR catalyst in an amount from about 10% to about 95%, inclusive, preferably about 50% to about 95%, inclusive. The blend may be covered by a coating comprising a second SCR catalyst, where the second SCR catalyst coating covers the entire blend coating. FIG. 7 depicts an example of this configuration, in which a third SCR catalyst is a bottom layer on a substrate, with a second layer comprising the blend, partially covering the third SCR catalyst, and a third layer, comprising a second SCR, positioned over the second layer and covering all of the blend layer.

Figure 8:
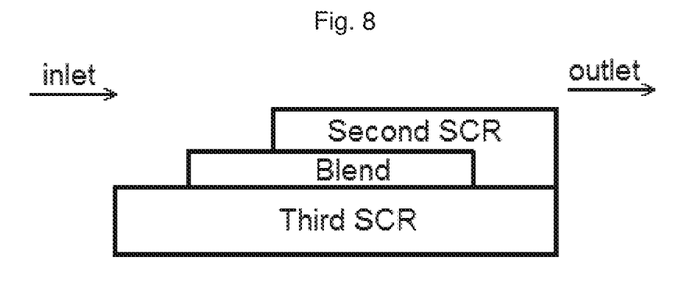
FIG. 8 depicts a configuration in which a third SCR catalyst is a bottom layer on a substrate, with a second layer comprising the blend, partially, but not completely, covering the third SCR catalyst, and a third layer, comprising a second SCR catalyst, positioned over and partially, but not completely, covering the blend layer.

In an eighth configuration, a catalyst can comprise a first layer comprising a third SCR catalyst. The first layer may be partially, but not completely, covered by a coating comprising a blend of (1) platinum on a support and (2) a first SCR catalyst. The blend can cover the third SCR catalyst in an amount from about 10% to about 95%, inclusive, preferably about 50% to about 95%. The blend may be covered by a coating comprising a second SCR catalyst, where the second SCR catalyst coating partially, but not completely, covers the blend coating, and a portion of the second SCR catalyst coating is also located downstream of the blend and also covers a portion of the third SCR catalyst downstream from the blend coating. The second SCR catalyst can cover the third SCR catalyst in an amount from about 10% to about 95%, inclusive, preferably about 50% to about 95%, inclusive. FIG. 8 depicts an example of this configuration, in which a third SCR catalyst is a bottom layer on a substrate, with a second layer comprising the blend, partially, but not completely, covering the third SCR catalyst, and a third layer, comprising a second SCR catalyst, positioned over the second layer and partially, but not completely, covering the blend layer. In FIG. 8, the blend layer covers about 60% of the first layer and the layer with the second SCR catalyst covers about 20% of the first layer. The term "cover" means the portion of a layer that is in direct contact with a different layer.

Reductant/Urea Injector

Systems of some embodiments of the present invention may include a means for introducing a nitrogenous reductant into the exhaust system upstream of the ammonia slip catalyst. It may be preferred that the means for introducing a nitrogenous reductant into the exhaust system is directly upstream of the ammonia slip catalyst (e.g. there is no intervening catalyst between the means for introducing a nitrogenous reductant and the ammonia slip catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce NOx therein. Preferred control means may include an electronic control unit, optionally an engine control unit, and may additionally comprise a NOx sensor located downstream of the NO reduction catalyst.

Method of Making

Catalytic articles of some embodiments of the present invention may be prepared by any suitable means known in the art. For catalytic articles including platinum on a support, such platinum may be fixed on the support in solution, i.e. in-situ, such that no separate pre-fixing process is required. To prepare a coating which includes a blend of (1) platinum on a support and (2) an SCR catalyst, the following steps may be performed:

Combine support material with water into a batch and mix;

Add an organic acid that acts as a reductant for platinum and/or creates a reducing environment during the later calcinating step. Examples of a suitable organic acid may include citric acid, succinic acid, oxalic acid, ascorbic acid, acetic acid, formic acid, and combinations thereof;

Add platinum nitrate into the batch, in an amount such that the molar ratio of organic acid to platinum is 20:1 to 1:1; 10:1 to 1:1; or 5:1 to 1:1;

Combine the platinum batch with an SCR batch;

Adjust rheology and solids % of the combined batch, coat and fire at 500° C.-550° C. in air.

Method of Using

A method of reducing emissions from an exhaust stream may include contacting the exhaust stream with a catalytic article as described herein. In some embodiments, a method of improving $NH_3$ conversion an exhaust gas at a temperature of about 300° C. or less may include contacting an exhaust gas comprising ammonia with a catalytic article as described herein. In some embodiments, a method of treating exhaust gas comprising ammonia and NOx may include contacting an exhaust gas comprising ammonia with a catalytic article as described herein. In some embodiments, the weight ratio of ammonia to NOx (ANR) in the exhaust gas is >1.0 for at least a portion of the operating time of the system Benefits Catalytic articles of the present invention may provide improvements in catalytic activity and selectivity Ammonia slip catalysts which include a layer with a blend of (1) a platinum group metal on a support and (2) an SCR catalyst have provided improvements in both $N_2O$ formation and NOx re-make, however, certain of these catalysts may exhibit drawbacks and/or limitations. Specifically, where such catalysts require pre-fixing the platinum group metal on a support, such catalysts involve the extra cost associated with the pre-fixing step, and may exhibit lower $NH_3$ conversion at low temperatures (such as below 300° C.), and under challenging conditions (such as high $NH_3$ slip and/or high space velocity).

It has surprisingly been found that catalytic articles of the present invention may minimize or lessen such aforementioned drawbacks and limitations. For example, by fixing a platinum group metal to a support in solution, i.e. in-situ, the additional cost associated with the pre-fixing step is eliminated. Additionally, such catalytic articles exhibit improved $NH_3$ conversion at low temperatures (such as below 300° C.), and under challenging conditions (such as high $NH_3$ slip and/or high space velocity).

In some embodiments, catalytic articles of the present invention having a platinum group metal which was fixed on a support in solution may provide equivalent or enhanced activity for $NH_3$ conversion at temperatures of about 300° C. or less compared to a catalytic article which is equivalent except has a platinum group metal pre-fixed on a support. In some embodiments, catalytic articles of the present invention having a platinum group metal which was fixed on a support in solution may have enhanced activity for $NH_3$ conversion at temperatures of about 300° C. or less comparted to a catalytic article which is equivalent except has a platinum group metal pre-fixed on a support, the inventive catalytic article showing an improvement in $NH_3$ conversion at temperatures of about 300° C. or less of about 30% to about 100%; about 35% to about 95%; about 40% to about 90%; about 45% to about 85%; about 50% to about 80%; about 55% to about 75%; about 30% to about 50%; about 35% to about 55%; about 40% to about 60%; about 50% to about 70%; about 60% to about 80%; about 70% to about 90%; about 80% to about 100%; greater than 30%; greater than 40%; greater than 50%; greater than 60%; greater than 70%; greater than 80%; or greater than 90%.

In some embodiments, catalytic articles of the present invention having platinum on a support comprising a high external surface area zeolite (>50 $m^2/g$) or a $SiO_2$—$Al_2O_3$ mixed oxide may provide equivalent or enhanced activity for $NH_3$ conversion at temperatures of about 300° C. or less compared to a catalytic article which is equivalent except has a platinum group metal fixed on a support other than a high external surface area zeolite (>50 $m^2/g$) or a $SiO_2$—$Al_2O_3$ mixed oxide. In some embodiments, catalytic articles of the present invention having platinum on a support comprising a high external surface area zeolite (>50 $m^2/g$) or a $SiO_2$—$Al_2O_3$ mixed oxide may provide equivalent or enhanced activity for $NH_3$ conversion at temperatures of about 300° C. or less compared to a catalytic article which is equivalent except has a platinum group metal fixed on a support other than a high external surface area zeolite (>50 $m^2/g$) or a $SiO_2$—$Al_2O_3$ mixed oxide, the inventive catalytic article showing an improvement in $NH_3$ conversion at temperatures of about 300° C. or less of about 30% to about 100%; about 35% to about 95%; about 40% to about 90%; about 45% to about 85%; about 50% to about 80%; about 55% to about 75%; about 30% to about 50%; about 35% to about 55%; about 40% to about 60%; about 50% to about 70%; about 60% to about 80%; about 70% to about 90%; about 80% to about 100%; greater than 30%; greater than 40%; greater than 50%; greater than 60%; greater than 70%; greater than 80%; or greater than 90%.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

When a range, or ranges, for various numerical elements are provided, the range, or ranges, can include the values, unless otherwise specified.

The term "$N_2$ selectivity" means the percent conversion of ammonia into nitrogen.

The terms "diesel oxidation catalyst" (DOC), "diesel exotherm catalyst" (DEC), "NOx absorber", "SCR/PNA" (selective catalytic reduction/passive NOx adsorber), "cold-start catalyst" (CSC) and "three-way catalyst" (TWC) are well known terms in the art used to describe various types of catalysts used to treat exhaust gases from combustion processes.

The term "platinum group metal" or "PGM" refers to platinum, palladium, ruthenium, rhodium, osmium and iridium. The platinum group metals are preferably platinum, palladium, ruthenium or rhodium.

The terms "downstream" and "upstream" describe the orientation of a catalyst or substrate where the flow of exhaust gas is from the inlet end to the outlet end of the substrate or article.

The following examples merely illustrate the invention; the skilled person will recognize many variations that are within the spirit of the invention and scope of the claims.

EXAMPLE

In-situ blend catalysts were prepared including platinum on a support blended with an SCR catalyst. Various catalysts were prepared, using different supports, as noted in Table 1 below.

To prepare the in-situ blend catalysts, in-situ platinum fixing was used, i.e. platinum precursor was fixed onto the support in solution and therefore no separate pre-fixing process is required, as described below:

Combine support material with water into a batch and mix;

Add an organic acid that acts as a reductant for platinum and/or creates a reducing environment during the later calcinating step. Examples of a suitable organic acid may include citric acid, succinic acid, oxalic acid, ascorbic acid, acetic acid, formic acid, and combinations thereof;

Add platinum nitrate into the batch, in an amount such that the molar ratio of organic acid to platinum is 20:1 to 1:1; 10:1 to 1:1; or 5:1 to 1:1;

Combine the platinum batch with an SCR batch;

Adjust rheology and solids % of the combined batch, coat and fire at 500° C.-550° C. in air.

TABLE 1

Properties of the support materials used in in-situ fixing of Pt

| Name | Composition | Accessible surface area for platinum ($m^2/g$)* |
|---|---|---|
| Alumina | $Al_2O_3$ | 140 |
| Nano-alumina | $Al_2O_3$ | 220 |
| Fumed silica | $SiO_2$ | 200 |
| Silica gel | $SiO_2$ | 500 |
| Silica-titania | 10% $SiO_2$, 90% $TiO_2$ | 110 |
| Silica-alumina | 40% $SiO_2$, 60% $Al_2O_3$ | 500 |
| zeolite | MFI, $SiO_2$-to-$Al_2O_3$ ratio = 2000 | 5 |
| Nano zeolite | MFI, $SiO_2$-to-$Al_2O_3$ ratio = 400 | 80 |

*Note:
total BET surface area are used for oxides; t-Plot external surface area are used for zeolites The following catalysts were prepared:

Reference ASC:

A bi-layer formulation having a Pt on alumina bottom layer and an SCR top layer was used as a reference example.

A bottom layer was applied to a ceramic substrate using a washcoat comprising 0.17 wt % Pt on a blend of alumina and bare zeolite. The washcoat was applied to a ceramic substrate, then the washcoat was pulled down the substrate using a vacuum. The article was dried and calcined at about 500° C. for about 1 hour. The loading of Pt on the article was 3 g/ft$^3$.

A top layer was applied to the substrate coated with the bottom layer using a second washcoat comprising a Cu-CHA, then the washcoat was pulled down the substrate using a vacuum. The article was dried and calcined at about 500° C. for about 1 hour. The loading of CuCHA in the top layer was 1.8 g/in$^3$.

Pre-Fixed Pt-Zeolite Blend ASC:

A bottom layer was applied to a ceramic substrate using a washcoat comprising a blend of 4 wt % Pt on a ZSM-5 (MFI framework with SAR=2000) and a Cu-CHA. The washcoat was applied to a ceramic substrate, then the washcoat was pulled down the substrate using a vacuum. The article was dried and calcined at about 500° C. for about 1 hour. The loading of Pt, the zeolite and the CuCHA on the article was 3 g/ft$^3$, 0.045 g/in$^3$, and 0.9 g/in$^3$, respectively.

A top layer was applied to the substrate coated with the bottom layer using a second washcoat comprising a Cu-CHA, then the washcoat was pulled down the substrate a distance of about 50% of the length of the substrate using a vacuum. The article was dried and calcined at about 500° C. for about 1 hour. The loading of CuCHA in the top layer was 1.8 g/in$^3$.

In-Situ Blend ASC:

Bi-layer formulations having in-situ fixed Pt-support blend with Cu-CHA bottom layer and an SCR top layer with various support materials for Pt were prepared by the previously described procedure.

The bottom layers comprised 3.5 wt % Pt on the supports listed in Table 1. The loading of Pt, the support material and the CuCHA on the article was 3 g/ft$^3$, 0.05 g/in$^3$, and 0.9 g/in$^3$, respectively.

A top layer was applied to the substrate coated with the bottom layer using a second washcoat comprising a Cu-CHA, then the washcoat was pulled down the substrate using a vacuum. The article was dried and calcined at about 500° C. for about 1 hour. The loading of CuCHA in the top layer was 1.8 g/in$^3$.

The prepared catalysts were tested under the following conditions:

Aging conditions: 650 C under 10% $H_2O$ in air for 50 hours

Figure 9:
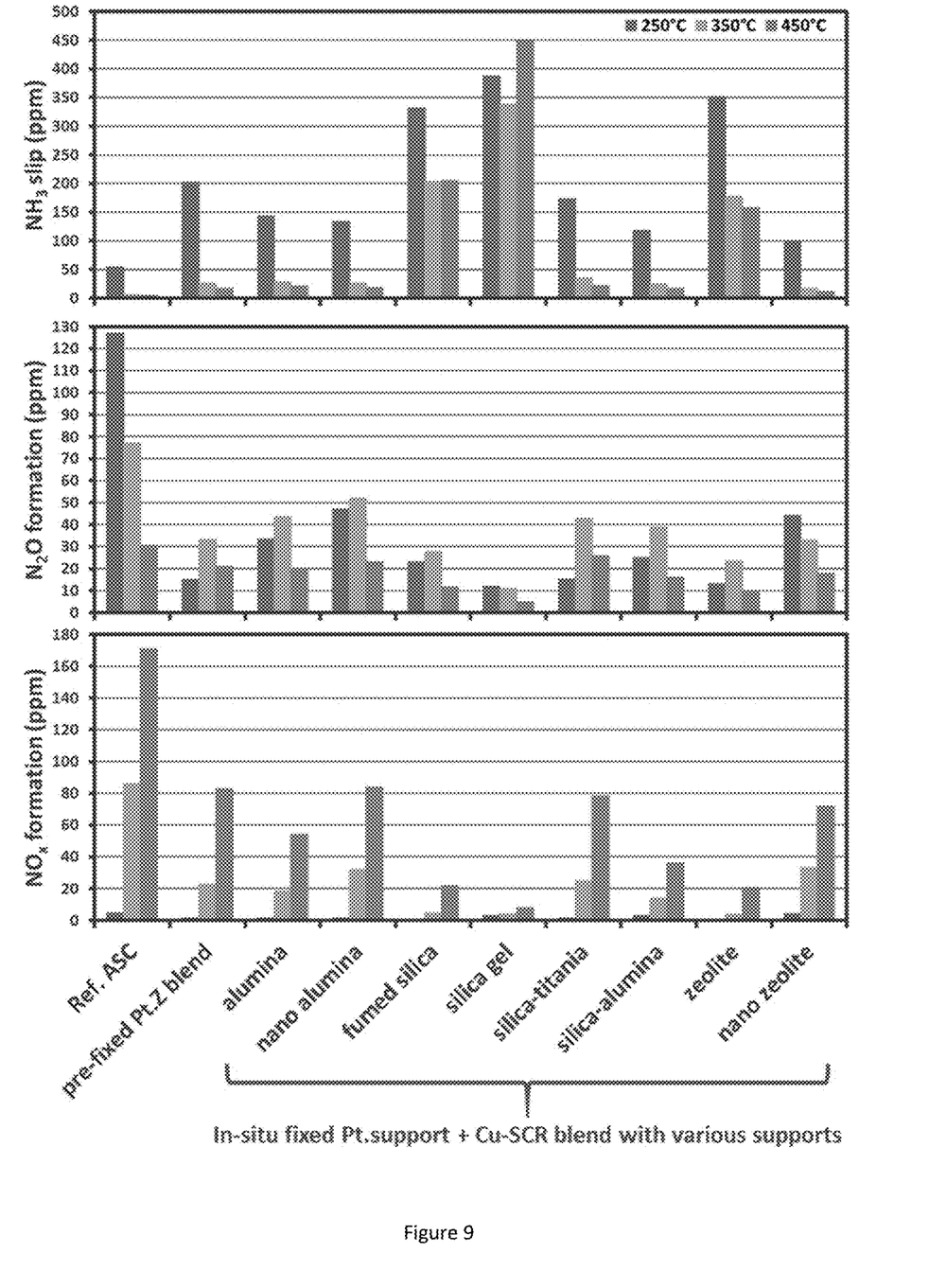
FIG. 9 shows the $NH_3$ slip, $N_2O$ and NOx formation when various ASCs are exposed to one minute pulse of 1000 ppm $NH_3$.

Testing conditions: 1 min 1000 ppm $NH_3$ pulse in 10% $O_2$, 4.5% $H_2O$, 4.5% $CO_2$, balance $N_2$; at SV=120,000 h$^{-1}$ FIG. 9 summarizes the $NH_3$ slip, $N_2O$ and NOx formation when various ASCs are exposed to one minute pulse of 1000 ppm $NH_3$. All catalysts have equivalent Pt loading at 3 g/ft$^3$ and CuCHA top layer at the same loading. Comparing to reference ASC, all blend ASCs (both pre-fixed Pt-zeolite and in-situ Pt-support formulations) showed clear advantages in lower $N_2O$ and NOx formation. However, the $NH_3$ conversion efficiency is highly dependent on the choice of Pt support material. Comparing to pre-fixed Pt-zeolite blend ASC, the in-situ blend ASCs with alumina, silica-alumina or silica-titania as Pt support all showed similar or improved $NH_3$ conversion. Samples with pure siliceous materials (fumed silica, silica gel, and siliceous zeolite) as Pt support, in general, have worst $NH_3$ conversion; with the only exception of nano-zeolite which showed highest $NH_3$ conversion activity among all blend ASCs tested.

The invention claimed is:

1. A method of making a catalytic article, the method comprising:
   a. preparing a first catalyst composition comprising a blend of (1) platinum on a support, and (2) a first SCR catalyst,
      wherein the support comprises at least one of zeolite or $SiO_2$—$Al_2O_3$ mixed oxide, and
      wherein preparing the first catalyst composition comprises fixing the platinum on the support in solution; and
      wherein the first SCR catalyst comprises a base metal, an oxide of a base metal, a molecular sieve, a metal exchanged molecular sieve, a metal oxide, a mixed oxide, or a mixture thereof;
   b. preparing a second catalyst composition comprising a second SCR catalyst, wherein the second SCR catalyst comprises a base metal, an oxide of a base metal, a molecular sieve, a metal exchanged molecular sieve, a metal oxide, a mixed oxide, or a mixture thereof;

c. applying the first catalyst composition to a substrate having an inlet and an outlet to create a first coating;

d. applying the second catalyst composition to the substrate to create a second coating.

2. The method of claim 1, wherein the support comprises a $SiO_2$—$Al_2O_3$ mixed oxide.

3. The method of claim 2, wherein $SiO_2$ is present in an amount of 1 wt % to about 70 wt % of the mixed oxide.

4. The method of claim 1, wherein the support comprises a zeolite.

5. The method of claim 4, wherein the zeolite comprises an external surface area of at least 50 $m^2/g$.

6. The method of claim 4, wherein the zeolite has a silica-to-alumina ratio of greater than 100.

7. The method of claim 4, wherein the zeolite is selected from the group of Framework Types consisting of CHA, LEV, AEI, AFX, ERI, SFW, KFI, DDR, ITE, BEA, MFI and FER.

8. The method of claim 1, wherein the second coating completely overlaps the first coating.

9. The method of claim 1, wherein the second coating partially overlaps the first coating.

10. The method of claim 1, wherein the second coating extends from the inlet end toward the outlet end covering less than a full length of the substrate.

11. The method of claim 1, wherein the first coating extends from the outlet end towards the inlet end covering less than a full length of the substrate.

12. The method of claim 1, wherein the second SCR catalyst is located on the inlet side of the coating comprising the blend of platinum on a support with the first SCR catalyst.

13. The method of claim 1, wherein the second SCR catalyst is located on the outlet side of the coating comprising the blend of platinum on a support with the first SCR catalyst.

14. The method of claim 1, wherein a weight ratio of the first SCR catalyst to platinum on the support is in the range of 0:1 to 300:1 based on the weight of these components.

15. The method of claim 1, wherein the blend further comprises at least one of palladium (Pd), gold (Au), silver (Ag), ruthenium (Ru), or rhodium (Rh).

16. The method of claim 1, wherein preparing the first catalyst composition comprises:
  a. preparing a platinum batch by:
    i. combining the support with water;
    ii. adding an organic acid;
    iii. adding platinum precursor such that a molar ratio of organic acid to platinum is 20:1 to 1:1; and
  b. combining the platinum batch with an SCR batch comprising the first SCR catalyst.

17. The method of claim 16, wherein the platinum precursor comprises platinum nitrate.

18. The method of claim 1, wherein the first SCR catalyst comprises a metal exchanged molecular sieve.

19. The method of claim 1, wherein the second SCR catalyst comprises a metal exchanged molecular sieve.

20. The method of claim 1, wherein the first SCR catalyst comprises a metal oxide supported on a refractory oxide.

21. The method of claim 1, wherein the second SCR catalyst comprises a metal oxide supported on a refractory oxide.

* * * * *